A. LARSEN.
ROTARY KILN.
APPLICATION FILED MAY 12, 1920.

1,358,761.

Patented Nov. 16, 1920.
2 SHEETS—SHEET 2.

WITNESS

INVENTOR
Axel Larsen
BY
Redding & Greeley
ATTORNEYS

UNITED STATES PATENT OFFICE.

AXEL LARSEN, OF AALBORG, DENMARK, ASSIGNOR TO F. L. SMIDTH & CO., OF NEW YORK, N. Y., A CORPORATION OF NEW JERSEY.

ROTARY KILN.

1,358,761.        Specification of Letters Patent.      Patented Nov. 16, 1920.

Application filed May 12, 1920. Serial No. 380,855.

*To all whom it may concern:*

Be it known that I, AXEL LARSEN, a subject of the King of Denmark, residing in Aalborg, Denmark, have invented certain new and useful Improvements in Rotary Kilns, of which the following is a specification, reference being had to the accompanying drawings, forming a part hereof.

In other applications filed concurrently herewith there are shown and described certain constructions of rotary kilns which have for their object to effect an economy in operation by withdrawing from the sintering portion of the kiln, or that portion in which the carbonic acid is driven off, the surplus products of combustion and permitting them to do useful work, the products of combustion so withdrawn not being required to effect the evaporation of the water from the slurry fed to the upper end of the kiln or the preliminary heating of the resulting raw meal which, in quantity, can be sintered in the same kiln. The present invention has for its object to effect a like economy, not, however, by withdrawing from the kiln a portion of the products of combustion, but by utilizing all of the products of combustion in a given kiln in the evaporating of the water from the slurry and the drying of the resulting raw meal in excess of the amount of raw meal capable of being sintered in the kiln and withdrawing from the kiln a portion of the dried raw meal for sintering in another kiln of any kind, the surplus heat from which other kiln may be put to a useful purpose in another heating chamber as, for example, that of a boiler plant. In accordance with the present invention, therefore, provision is made whereby a portion of the heated raw meal is withdrawn from the kiln before it reaches the sintering zone or the zone in which the carbonic acid is driven off and is conveyed to another kiln for sintering. The invention will be more fully explained hereinafter with reference to the accompanying drawings in which it is illustrated and in which—

Figure 1:
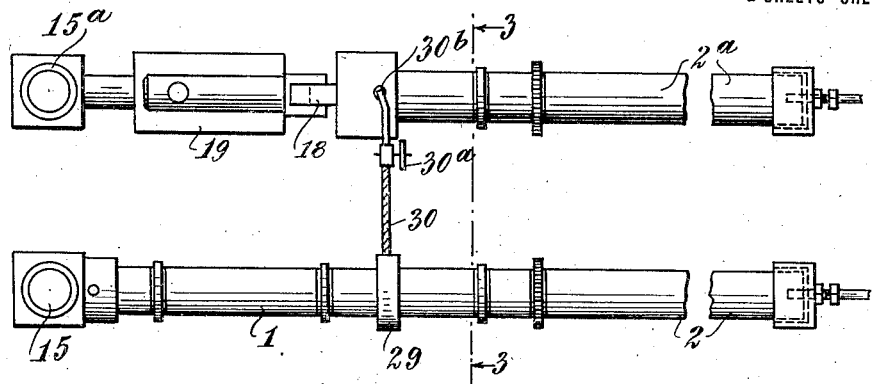
Figure 1 is a top view, in outline, of a cement burning plant and its accessories in which the invention is embodied.
Figure 2:
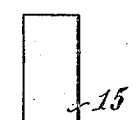
Fig. 2 is a view in elevation, also in outline, of the secondary kiln and its associated boiler plant.
Figure 3:
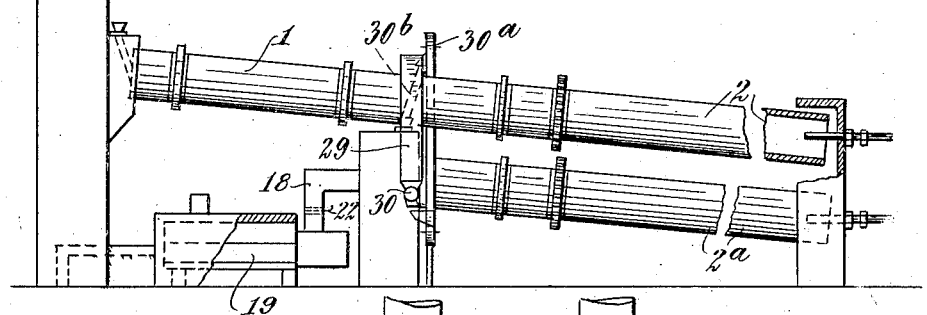
Fig. 3 is a view in section on the plane indicated by the broken line 3—3 of Fig. 1.
Figure 4:
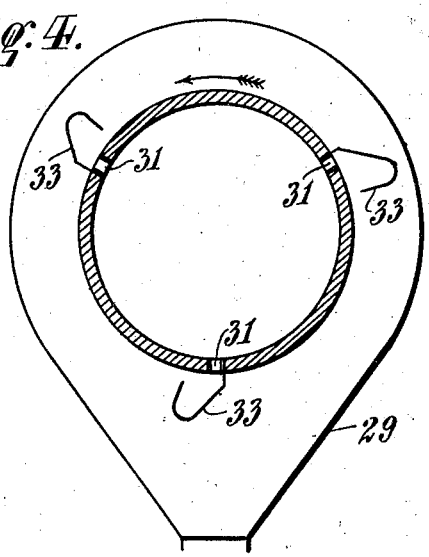
Figs. 4 and 5 are detail views in transverse and longitudinal section illustrating the means for permitting the passage of the heated raw meal from the primary kiln.
Figure 5:
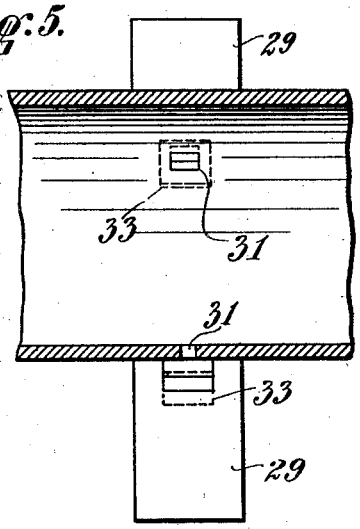

The main or primary kiln, shown in the drawings is continuous from the end at which the slurry is fed in to the end at which the clinker is discharged, comprising an upper portion 1, in which the evaporating of the water of the slurry and the heating of the raw meal are carried on, and a lower portion 2, in which the sintering is carried on. This kiln is supported and rotated in the usual manner, is connected at its upper end, as usual, to the stack 15, and is provided at its lower end with a suitable burner. Between the upper and lower portions the shell of the kiln, as shown clearly in Figs. 4 and 5, is formed with openings 31, guarded by hoods 33, through which openings and hoods some portion of the raw meal may find its way from the interior of the kiln into the surrounding, stationary casing 29, while the remainder of the raw meal, in such quantity as can be sintered successfully in the lower portion of the kiln, passes on into such lower portion. From the casing 29 the separated portion of the raw meal is transferred by a conveyer 30 and elevator 30ª to a hopper 30ᵇ from which it is delivered to a secondary kiln 2ª, which may be of any kind, but is shown as a rotary kiln, in such quantity as to be capable of being sintered therein. The hot gases or products of combustion from the secondary kiln 2ª are made to perform useful work by being conducted through a conduit 18, provided with a damper 22, to a heating chamber 19, such as that of a boiler plant, from which the products of combustion, with their temperature further reduced, may pass to the stack 15ª.

It will be understood that by the described construction the surplus heat from the sintering zone 2 of the primary kiln or that zone in which the carbonic acid is driven off is made to do useful work in evaporating an excess of slurry and heating the resulting raw meal, which is sintered in a secondary kiln, the surplus heat of which is made to do useful work in a heating chamber.

It will be understood that various changes in details of construction and arrangement may be made to suit different conditions of use and that the invention is not restricted to the precise construction shown except as pointed out in the claims.

I claim as my invention:

1. The combination of a primary rotary kiln adapted to receive an excess of slurry in its evaporating and drying portion and provided between its evaporating and heating portion and its portion in which the carbonic acid is driven off with an opening through which the excess of dried raw meal may escape, a secondary sintering kiln, and means to transfer the excess of dried raw meal from the primary kiln to the secondary kiln.

2. The combination of a primary rotary kiln adapted to receive an excess of slurry in its evaporating and drying portion and provided between its evaporating and heating portion and its portion in which the carbonic acid is driven off with an opening through which the excess of dried raw meal may escape, a secondary sintering kiln, a heating chamber, and means to conduct the products of combustion from the secondary kiln to the heating chamber.

This specification signed this 15th day of April, A. D. 1920.

AXEL LARSEN.

Witnesses as to signature:
P. O. KEMP,
K. BIRCH.